Nov. 5, 1968 G. PAOLETTI 3,408,668
HIVE FOR BEEKEEPING PROVIDED WITH QUICK ACCESS WAYS
FROM THE BOTTOM TO THE HONEY SMALL FRAMES
Filed March 11, 1966 2 Sheets-Sheet 2
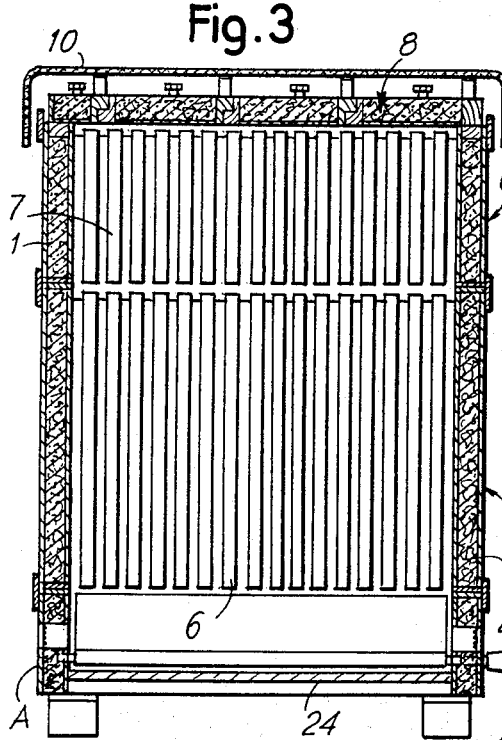
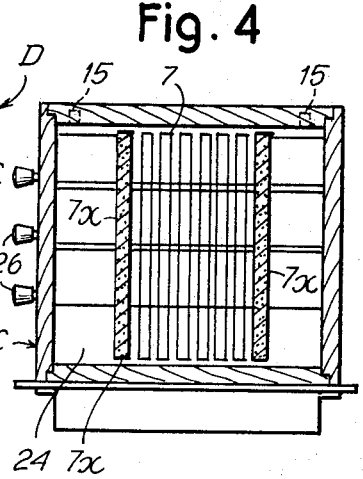
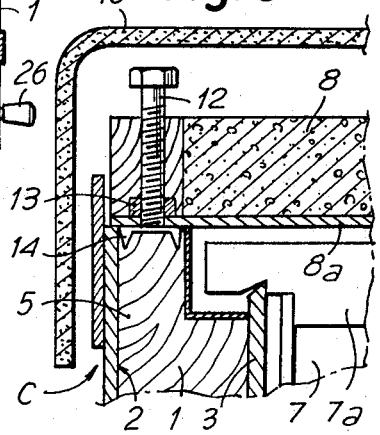
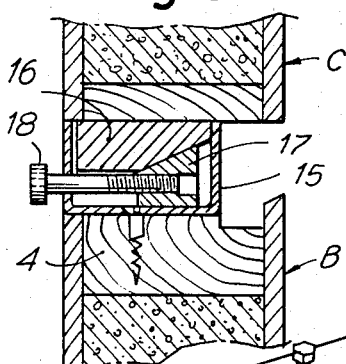
INVENTOR
GIOVANNI PAOLETTI

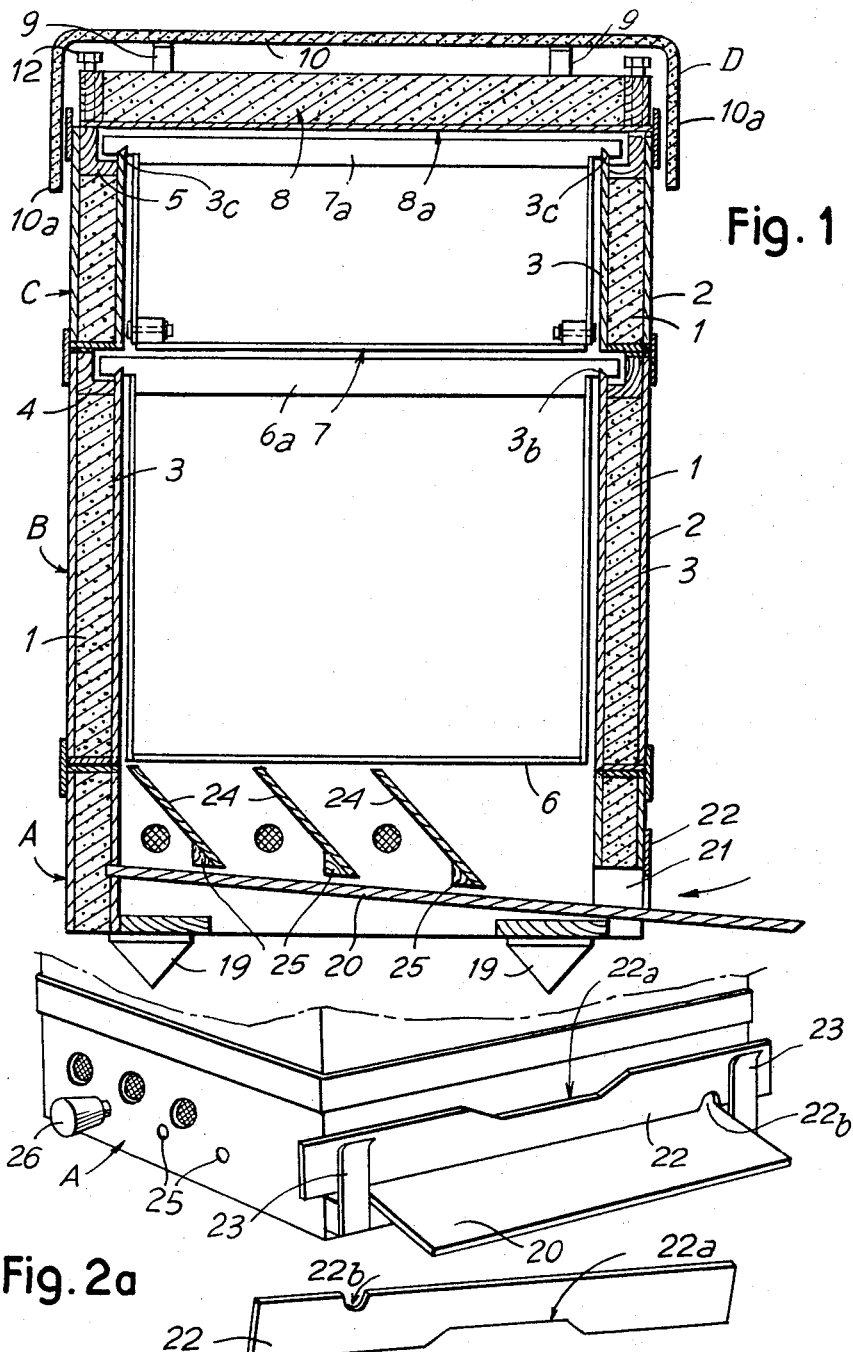

United States Patent Office 3,408,668
Patented Nov. 5, 1968

3,408,668
HIVE FOR BEEKEEPING PROVIDED WITH QUICK ACCESS WAYS FROM THE BOTTOM TO THE HONEY SMALL FRAMES
Giovanni Paoletti, Via E. Rubieri 5, Florence, Italy
Filed Mar. 11, 1966, Ser. No. 533,607
Claims priority, application Italy, Mar. 16, 1965, 6,025/65
7 Claims. (Cl. 6—1)

ABSTRACT OF THE DISCLOSURE

A beehive including a base, having front, rear and side walls, on which are superposed frame supporting cases each having front, rear and side walls forming continuations of the corresponding walls of the base, the base having an open upper end and the cases being opened at both ends. The base has a removable bottom which extends from its rear wall through an opening in the front wall, the bottom extending between the side walls of the base and sloping downwardly and outwardly through the opening in the front wall. An adjustable closure bar is provided for the front wall whereby, by inverting the bar, the effective size of the opening may be changed.

A plurality of ramps extend between the front and rear walls and between the side walls, these ramps being spaced along the direction of slope of the bottom of the base. The ramps incline upwardly and rearwardly, with their lower edges being spaced from the bottom of the base by a short distance sufficient to permit passage of the bees through the clearance thus provided. The upper edges of the ramps are closely adjacent the lower edges of the frames. The ramps are pivoted at their lower edges to the side walls, and means are provided for adjusting the slopes of the ramps in accordance with the heights of the particular frames in the lowermost case. Vent openings are provided in the base side walls, with each vent opening being behind and beneath a respective ramp.

Background of the invention

The invention relates to a beehive comprising a case and at least a set of vertical frames for wax sheets, hanging and spaced from the relatively inclined bottom of the hive chamber, being parallel with the maximum slope line of said bottom. According to the invention, the hive comprises additional preferably inclined walls extending in the interspace between the bottom and the frames inferior edge. These walls form access ramps to the frames for the bees passing on the inclined bottom.

This arrangement permits shortening the distance the bees have to cover strolling about inside the hive where the bees do not fly. Thus the nectar deposit is accelerated and the colony yield increases. Indeed bees can reach the small frames and the cells without covering the whole bottom and the rear wall, by going along the additional inclined walls or ramps.

Said additional walls are suitably spaced from the bottom and from the inferior edges of the frames by distances in a range from 6 to 13 mm., in order to allow the bees to pass through and to avoid the stop-wax, i.e. propolisation sealing.

Preferably the inclined walls have horizontal edges which are orthogonal with respect of the frames. According to an advantageous embodiment, the side walls are linked to the case flanks adjacent their inferior edges, to be inclined differently with respect to the sizes of the frames placed in the hive. On the side walls, rearwardly and under the inclined walls, airing or vent openings may be obtained.

A hive may be set up with the access opening along the inclined bottom defined by a shaped removable bar and with the inclined bottom also being removable for cleaning the materials which, falling down, are urged by the inclined walls towards the access opening.

The invention will be better understood following the specification and the drawings enclosed showing an embodiment of the invention. In the drawings:

FIG. 1 shows the beehive in an overall longitudinal section;

FIG. 2a is a partial perspective view of the beehive base;

FIG. 2b is a perspective view of a closure bar for an opening in the front wall of the base;

FIG. 3 shows the hive in cross-section;

FIG. 4 shows the hive in horizontal section in a reduced size;

FIGS. 5 and 6 show two details; and

FIG. 7 shows in perspective view the upper portion, the cover being dotted.

According to the drawings, A denotes the hive base, B the overlying portion of the hive case, on which the small frames are mounted, C the third portion of the hive case, wherein the honey frames are mounted, and D denotes the covering portion.

Each of the front, rear and side walls of base A and frame supporting cases B and C comprises an intermediate relatively thick layer 1 of synthetic resin insulating material, enclosed by an outer panel 2 and an inner panel 3, the panels 2 and 3 being synthetic resin material, such as plastic laminate or the like. In each of the parts A, B and C the wall components are denoted by the same references.

The upper edges of the walls of frame supporting cases B and C are provided with an angular shaped bar 4, for case B, and 5, for case C, respectively. Each bar 4 or 5 forms, with the upper corner of the associated inner panel 3, a channel having a rib 3b, in case B, and 3c, in case C. These ribs support the frame suspension bars 6a and 7a in the cases B and C, respectively, the respective frames being indicated at 6 and 7. When the number of frames is to be reduced with respect to the maximum number of frames, insulating panels 7x, as shown in FIG. 4, and formed of thermal insualting material, may be suspended in place of some frames 6 and 7. Thereby, the assembly of the reduced number of frames for the wax sheets may be enclosed either between two panels 7x or between a side wall of one of the cases and a panel 7x. The remaining excess space is left vacant.

8 denotes an upper closing having an internal coating plate 8a, while the upper surface of wall 8 may have supporting posts 9 to support a covering 10. This covering is developed like a parallelepiped box in hot deformed thermoplastic material or the like, and has side walls 10a surrounding the covering and the case side walls.

The covering D, i.e. the panel 8–8a, is detachable from section C by means of screw means as shown in FIG. 5 particularly. Said screw means comprise screws 12 engaged in nuts 13 built in the frame of the covering 8 and designed to act on small plates 14 mounted at the upper ends of the side walls of section C. With this arrangement, by acting on hexagon screws 12, the cover may be detached from section C even if the slot between section C and the cover is sealed by propolisation.

For the same reasons, i.e. in order to obtain detachment of section C from section B, further screw means may be provided. For this case, in the frame formed by the upper bars 4 of section B, two metal boxes 15 are embedded (see particularly FIG. 6) arranged on one side of the plan development of the case, said boxes comprising a heel 16 having an inclined wall and cooperating with a wedge 17. This latter may be operated by screw means 18 operable from the outside, in such a manner that, by retracting the wedge 17, lifting of heel 16 is caused, which acts on the inferior edge of section C, causing its detachment even in case of propolisation sealing.

In the base inferior section A, which bears appropriate supports 19, there is provided a sliding seat for an inclined bottom plane 20, which may be extracted and projects from the access opening formed by a window 21 defined between the front wall of section A and the upper surface of the bottom wall 20. This window is relatively very wide and the proper opening may be defined with the aid of a board 22 (see especially FIG. 2) which may be received in seats formed by plates 23 borne by the base A. Board 22 may be located in one of two vertical positions so as to rest on the plane 20 either with the edge forming a wide cavity 22a (to have a relatively wide opening) or with the edge having a small cavity 22b, when a relatively limited opening is required to defend the colony.

The side walls of section A are provided with linking pivots for a certain number of additional walls or ramps 24 extended inclined and pivotally mounted adjacent their inferior edge, as shown at 25, to the side walls of section A. Outer knobs 26 may be provided to permit pivotal adjustment of walls 24, so as to incline them more or less, maintaining substantially however a limited gap, i.e. a limited interspace between the bottom 20 and the inferior edges of walls 24. This interspace has a height between 12 and 6 mm., so as to allow, in any directed position of the additional walls 24, a sufficient space to permit transit of the bees along the bottom 20 under the walls 24, and so that the bees may climb upon walls 24. Walls 24 are inclined so as to reach the inferior edges of small frames 6 with a limited interspace having the same size as the interspace between the bottom 20 and the inferior edges of the walls 24.

With this arrangement, the bees may quickly reach the frames 6 along the walls 24, without having to cover the whole bottom 20 to the rear wall of the case in order then to reach the small frames. The variable inclination of walls 24 is made such as to allow the hive adjustment to different types of frames 6, which have two or three standard sizes and may thus be interchanged with frames having different sizes with respect to those illustrated. The knobs 26 may be operated so as to easily find, also stepwise, the desired positions for walls 24 with respect to the type of frames mounted in the hive.

It is intended that the drawings only illustrate an embodiment given only as a practical demonstration of the invention, said invention being capable of modification in forms and arrangements without however departing from the scope of the concept in forming said invention.

What I claim is:

1. A beehive comprising, in combination, a base having front, rear and side walls and including an inclined bottom extending from said rear wall through an opening in said front wall, said bottom extending between said side walls and sloping downwardly and outwardly through said opening; said base having an open upper end; at least one open-ended frame-supporting case superposed on said base and having front, rear and side walls forming upward extensions of the base walls; plural frames supported in each case in spaced, substantially parallel relation to each other and to the case side walls; and plural upwardly and rearwardly inclined ramps mounted in said base to extend between the base side walls, said ramps being spaced apart in the direction of the slope of said base bottom; the lower edges of said ramps being spaced at a substantially uniform small distance from the base bottom sufficient for passage of bees along the base bottom in the clearance thus provided; the upper edges of said ramps being at substantially equal small spacings from the lower edges of said frames.

2. A beehive, as claimed in claim 1, in which the upper edges of said ramps are spaced from the lower edges of said frames a distance in the range of 6 mm. to 13 mm.

3. A beehive, as claimed in claim 2, in which the planes of said ramps are perpendicular to the planes of said frames.

4. A beehive, as claimed in claim 2, in which said ramps are pivoted, at their lower edges, to the side walls of said base for variation in the inclination of said ramps in accordance with the depths of said frames.

5. A beehive, as claimed in claim 4, including externally accessible knobs each associated with a respective ramp and operable to adjust the inclination thereof.

6. A beehive, as claimed in claim 1, including vent openings in said side walls, each vent opening being rearwardly of and below a respective ramp.

7. A beehive, as claimed in claim 1, including a substantially flat bar arranged for mounting on the front wall of said base across the opening therein, said bar having a relatively wide notch formed in one longitudinal edge and a relatively narrow notch formed in the other longitudinal edge whereby, by inversion of said bar, the effective size of the opening in the front wall of said base may be varied.

References Cited

UNITED STATES PATENTS 3,200,419   8/1965   Root _____ 6—4

FOREIGN PATENTS 610,771   6/1926   France.
354,777   10/1937   Italy.

LUCIE H. LAUDENSLAGER, *Primary Examiner.*